(12) United States Patent
Wilber

(10) Patent No.: US 9,976,431 B2
(45) Date of Patent: May 22, 2018

(54) MID-TURBINE FRAME AND GAS TURBINE ENGINE INCLUDING SAME

(71) Applicant: UNITED TECHNOLOGIES CORPORATION, Farmington, CT (US)

(72) Inventor: John E. Wilber, East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 318 days.

(21) Appl. No.: 14/803,210

(22) Filed: Jul. 20, 2015

(65) Prior Publication Data

US 2016/0024949 A1    Jan. 28, 2016

Related U.S. Application Data

(60) Provisional application No. 62/027,613, filed on Jul. 22, 2014.

(51) Int. Cl.
| | |
|---|---|
| *F01D 11/00* | (2006.01) |
| *F01D 9/04* | (2006.01) |
| *F01D 9/02* | (2006.01) |
| *F16J 13/06* | (2006.01) |
| *F16J 15/34* | (2006.01) |
| *F01D 25/16* | (2006.01) |
| *F01D 25/24* | (2006.01) |

(52) U.S. Cl.
CPC ............... *F01D 9/041* (2013.01); *F01D 9/02* (2013.01); *F01D 9/044* (2013.01); *F01D 9/047* (2013.01); *F01D 11/005* (2013.01); *F01D 25/162* (2013.01); *F01D 25/246* (2013.01); *F16J 13/06* (2013.01); *F16J 15/3464* (2013.01); *F05D 2230/237* (2013.01); *F05D 2240/11* (2013.01); *F05D 2240/12* (2013.01); *Y02T 50/673* (2013.01)

(58) Field of Classification Search
CPC . F01D 9/02; F01D 9/041; F01D 9/047; F01D 17/14; F01D 17/141; F01D 17/143; F01D 17/145; F01D 17/146; F01D 17/148; F01D 11/005; F05D 2240/11; F05D 2240/80; F05D 2260/30
See application file for complete search history.

(56) References Cited

U.S. PATENT DOCUMENTS

| | | | | |
|---|---|---|---|---|
| 3,144,255 A | * | 8/1964 | Thorne | F02K 1/805 |
| | | | | 277/632 |
| 4,177,004 A | * | 12/1979 | Riedmiller | F01D 11/08 |
| | | | | 415/116 |
| 4,897,021 A | * | 1/1990 | Chaplin | F01D 5/22 |
| | | | | 267/160 |
| 4,921,401 A | * | 5/1990 | Hall | F01D 9/04 |
| | | | | 403/28 |
| 5,149,109 A | * | 9/1992 | Jelinek | F16J 15/067 |
| | | | | 277/631 |

(Continued)

*Primary Examiner* — Gerald L Sung
*Assistant Examiner* — Marc Amar
(74) *Attorney, Agent, or Firm* — Cantor Colburn LLP

(57) ABSTRACT

A mid-turbine frame for a gas turbine engine ducts gases between a high pressure turbine and a low pressure turbine. The mid-turbine frame may include an outer flowpath ring, an inner flowpath ring, and a plurality of vanes extending therebetween. The outer flowpath ring comprises a unitary structure, while the inner flowpath ring and the plurality of vanes comprises a plurality of segments.

15 Claims, 8 Drawing Sheets

(56) References Cited

U.S. PATENT DOCUMENTS

| | | | | |
|---|---|---|---|---|
| 5,451,116 A * | 9/1995 | Czachor | F01D 9/065 403/28 |
| 7,837,435 B2 * | 11/2010 | Ellis | F01D 5/10 415/119 |
| 8,105,016 B2 * | 1/2012 | Butz | F01D 5/22 415/119 |
| 9,222,413 B2 * | 12/2015 | Farah | F02C 7/20 |
| 9,303,528 B2 * | 4/2016 | Sanchez | F01D 9/065 |
| 9,587,514 B2 * | 3/2017 | Farah | F01D 25/16 |
| 2006/0034679 A1 * | 2/2006 | Harding | F01D 5/189 415/115 |
| 2007/0231134 A1 * | 10/2007 | Kumar | F01D 25/162 415/229 |
| 2007/0237635 A1 * | 10/2007 | Nagendra | F01D 25/162 415/229 |
| 2008/0022692 A1 * | 1/2008 | Nagendra | F01D 25/162 60/796 |
| 2008/0134687 A1 * | 6/2008 | Kumar | F01D 25/162 60/796 |
| 2008/0134688 A1 * | 6/2008 | Somanath | F01D 25/162 60/797 |
| 2010/0132371 A1 * | 6/2010 | Durocher | F01D 9/065 60/796 |
| 2010/0135770 A1 * | 6/2010 | Durocher | F01D 9/065 415/69 |
| 2012/0082540 A1 * | 4/2012 | Dziech | F01D 11/005 415/173.1 |
| 2013/0224010 A1 | 8/2013 | Farah et al. |
| 2013/0323045 A1 * | 12/2013 | Porter | F16J 15/0887 415/229 |
| 2013/0336794 A1 * | 12/2013 | Armstrong | F01D 9/00 416/189 |
| 2014/0007588 A1 | 1/2014 | Sanchez et al. |
| 2014/0007589 A1 * | 1/2014 | Zimmermann | F01D 25/08 60/796 |
| 2014/0093372 A1 * | 4/2014 | Stewart | B23K 31/02 415/215.1 |
| 2016/0258305 A1 * | 9/2016 | Wilber | F01D 9/042 |
| 2016/0281524 A1 * | 9/2016 | Wilber | F01D 9/06 |
| 2017/0130599 A1 * | 5/2017 | Bunker | F01D 11/005 |

* cited by examiner

US 9,976,431 B2

MID-TURBINE FRAME AND GAS TURBINE ENGINE INCLUDING SAME

CROSS REFERENCE TO RELATED APPLICATION

This application claims the benefit of and incorporates by reference herein the disclosure of U.S. Ser. No. 62/027,613, filed Jul. 22, 2014.

TECHNICAL FIELD OF THE DISCLOSURE

The present disclosure relates generally to a gas turbine engine, and more specifically to a mid-turbine frame for a gas turbine engine.

BACKGROUND OF THE DISCLOSURE

Gas turbine engines (e.g., jet engines) generally include a compressor to pressurize inflowing air, a combustor to burn a fuel in the presence of the pressurized air, and a turbine to extract energy from the resulting combustion gases. The compressor may comprise a low pressure compressor, as well as a high pressure compressor. The turbine may likewise comprise a high pressure turbine and a low pressure turbine.

SUMMARY OF THE DISCLOSURE

In one embodiment, a mid-turbine frame for a gas turbine engine is disclosed, comprising: a duct that extends between a high pressure turbine and a low pressure turbine, the duct comprising an outer flowpath ring and an inner flowpath ring; wherein the inner flowpath ring is situated radially inward of the outer flowpath ring; wherein the outer flowpath ring comprises a unitary structure; and wherein the inner flowpath ring comprises a plurality of segments that together form the inner flowpath ring.

In a further embodiment of the above, each segment includes a first tenon that defines a first axial terminus of each segment and a second tenon that defines a second axial terminus of each segment.

In a further embodiment of any of the above, the inner flowpath ring comprises a plurality of inner arcing surfaces, each of the inner arcing surfaces carrying at least one vane that extends from radially outward from the inner arcing surface toward the outer flowpath ring.

In a further embodiment of any of the above, each of the segments are formed as a unitary structure.

In a further embodiment of any of the above, each vane includes a channel.

In a further embodiment of any of the above, the first tenon of a first segment is joined to the second tenon of a second segment by a seal that clamps the first tenon and the second tenon together.

In a further embodiment of any of the above, the seal comprises: a male seal structure having a body and a protruding member extending away from the body; and a receiving member having an aperture configured to receive the protruding member.

In a further embodiment of any of the above, the mid-turbine frame further comprises a fastener configured to be coupled to the protruding member to retain the protruding member in contact with the receiving member.

In a further embodiment of any of the above, the receiving member is coupled to a radially inward portion of the first and second tenons and the male seal structure is coupled to a radially outward portion of the first and second tenons.

In a further embodiment of any of the above, the duct defines a hot gas path between the high pressure turbine and the low pressure turbine.

In a further embodiment of any of the above, the plurality of vanes are coupled to the outer annular structure.

In a further embodiment of any of the above, said coupling comprises welding and brazing.

In a further embodiment of any of the above, two of the vanes extend from each segment.

In a further embodiment of any of the above, each segment comprises a first segment portion coupled to a second segment portion.

In another embodiment, a gas turbine engine is disclosed, comprising: a compressor section, a combustor section, a high pressure turbine, a mid-turbine frame, and a low pressure turbine in serial flow communication, wherein the mid-turbine frame comprises: a duct that extends between the high pressure turbine and the low pressure turbine, the duct comprising an outer flowpath ring and an inner flowpath ring; wherein the inner flowpath ring is situated radially inward of the outer flowpath ring; wherein the outer flowpath ring comprises a unitary structure; and wherein the inner flowpath ring comprises a plurality of segments that together form the inner flowpath ring.

In a further embodiment of the above, each segment includes a first tenon that defines a first axial terminus of each segment and a second tenon that defines a second axial terminus of each segment.

In a further embodiment of any of the above, the inner flowpath ring comprises a plurality of inner arcing surfaces, each of the inner arcing surfaces carrying at least one vane that extends from radially outward from the inner arcing surface toward the outer flowpath ring.

In a further embodiment of any of the above, each of the segments are formed as a unitary structure.

In a further embodiment of any of the above, the first tenon of a first segment is joined to the second tenon of a second segment by a seal that clamps the first tenon and the second tenon together.

In a further embodiment of any of the above, the plurality of vanes are coupled to the outer annular structure.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
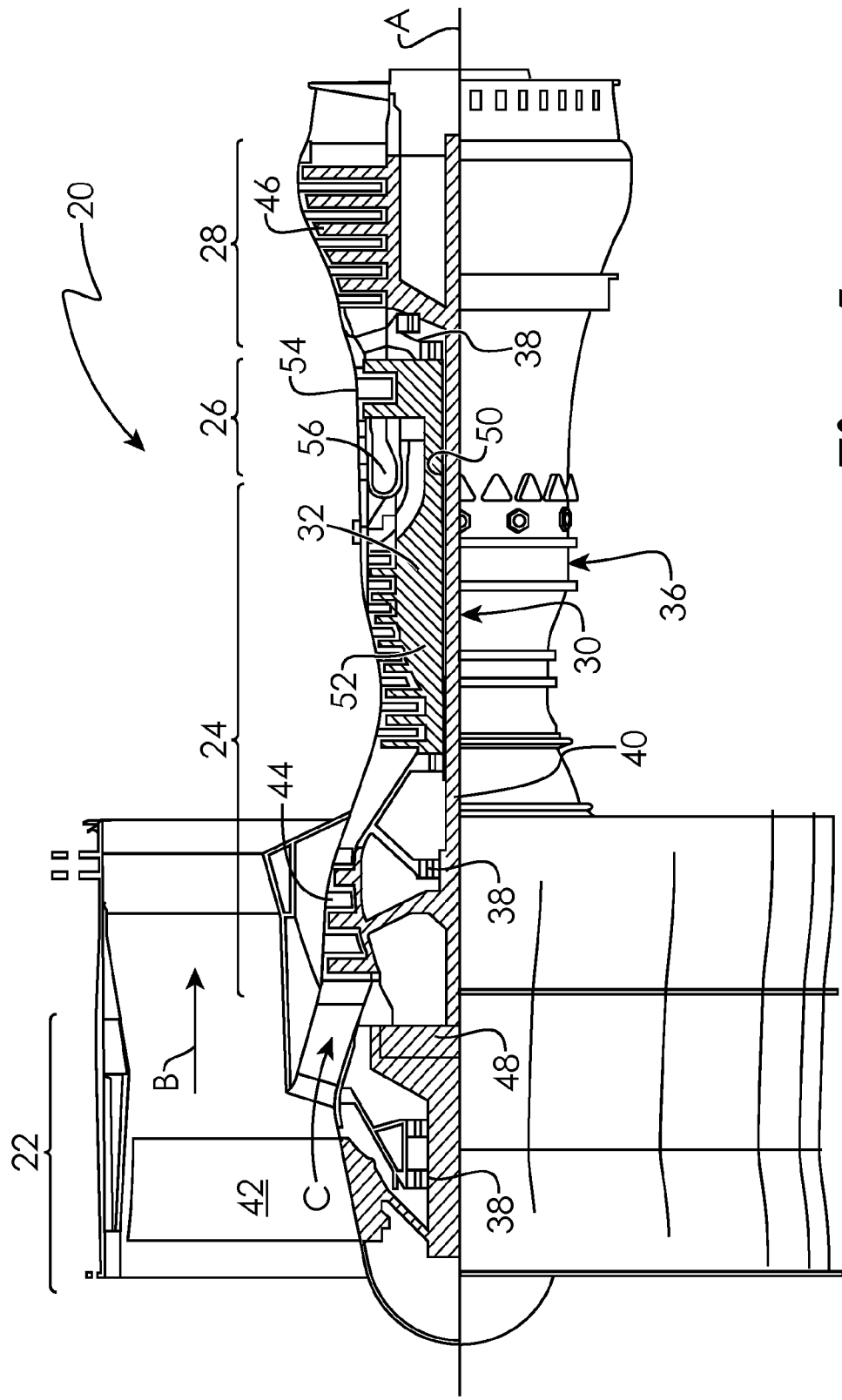
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 m/sec).

As described above, gas turbine engines 20 generally include a compressor to pressurize inflowing air, a combustor to burn a fuel in the presence of the pressurized air, and a turbine to extract energy from the resulting combustion gases. The turbine may be divided into two sections. These include a high pressure turbine (or "HPT") 54 situated forward of a low pressure turbine (or "LPT") 46. The combustor 56 may be disposed axially forward of the HPT 54 and the LPT 46. Hot gas from the combustor 56 of a gas turbine engine may flow into the HPT 54 and the LPT 46, in that order, from forward to aft. The kinetic energy of the hot gas is captured by the HPT 54 and the LPT 46 and converted into more useful forms of energy. High pressure turbines tend to operate at maximum efficiency when the gas is hot and the high pressure turbine is small. Low pressure turbines tend to work at maximum efficiency when the hot gases operate at the low pressure turbine's largest diameter. Thus, for improved efficiency, there may be a large difference in the diameter between a high pressure turbine and a low pressure turbine. Conventionally, the forward stages of the low pressure turbine were not as efficient as they could be. However, by using or coupling a mid-turbine frame between the HPT 54 and the LPT 46, the hot gases may rapidly expand as they exit the HPT 54 to gain a large diameter upon entry into the forward stages of the LPT 46. For further information, U.S. Provisional Patent Application Ser. No. 61/925,001 is hereby incorporated by reference in its entirety.

Figure 2:
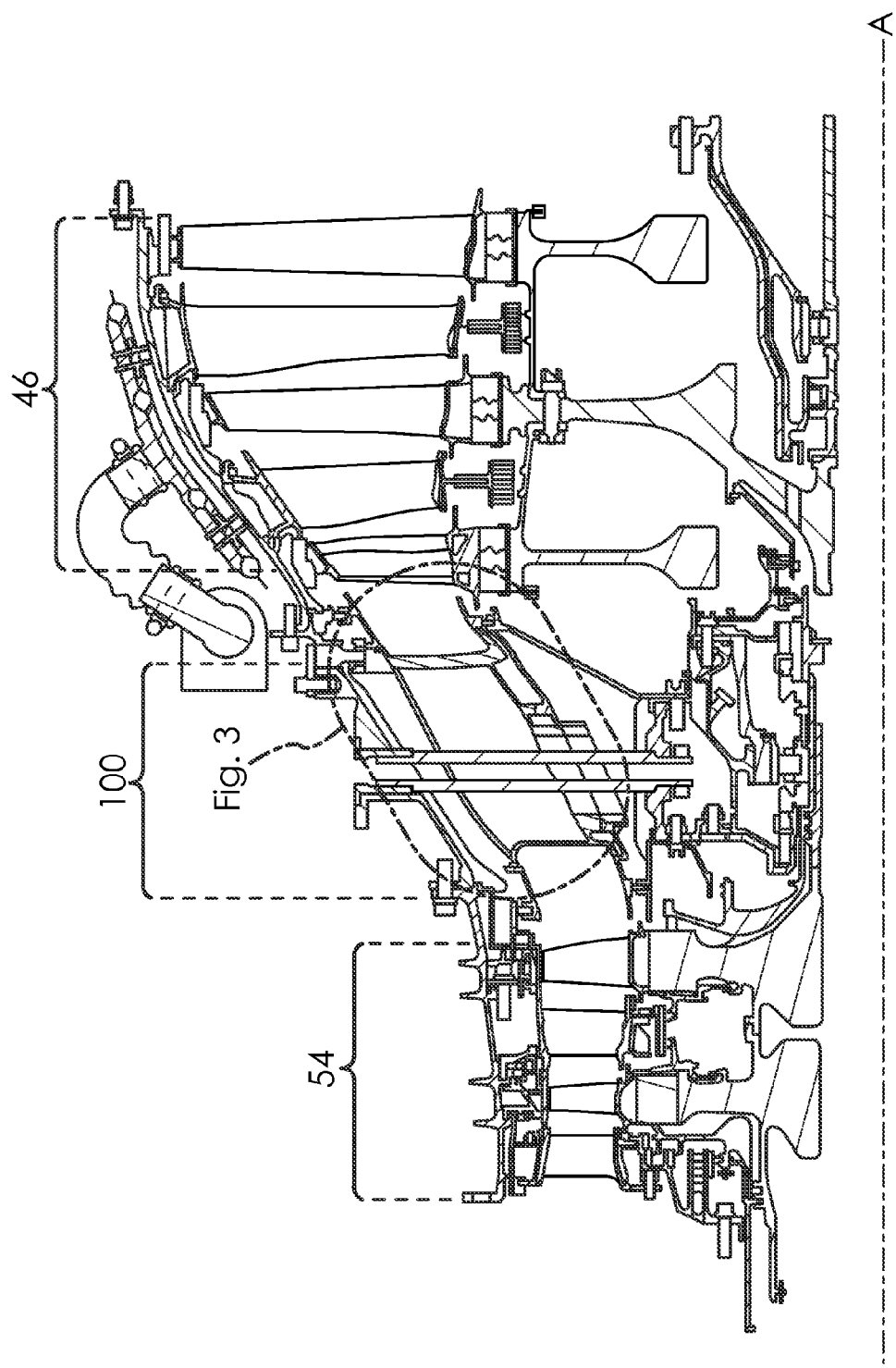
FIG. 2 is a schematic cross-sectional view of a portion of a high pressure turbine, mid-turbine frame, and low pressure turbine section in an embodiment.

In various embodiments, a structure, which may be referred to herein as a "mid-turbine frame" or "MTF" 100 may be included as part of the gas turbine engine 20. More particularly, as shown with respect to FIG. 2, the MTF 100 may be disposed aft of the HPT 54 and forward of the LPT 46. The MTF 100 may generally comprise a duct configured to convey (hot) combustion gasses from the HPT 54 to the LPT 46. The MTF 100 may thus comprise an annular and/or semi-annular duct configured, in particular, to permit the expansion of hot gasses exiting the HPT 54 into the LPT 46. The MTF 100 may enlarge in diameter as it extends from forward to aft along the central axis A.

Figure 3:
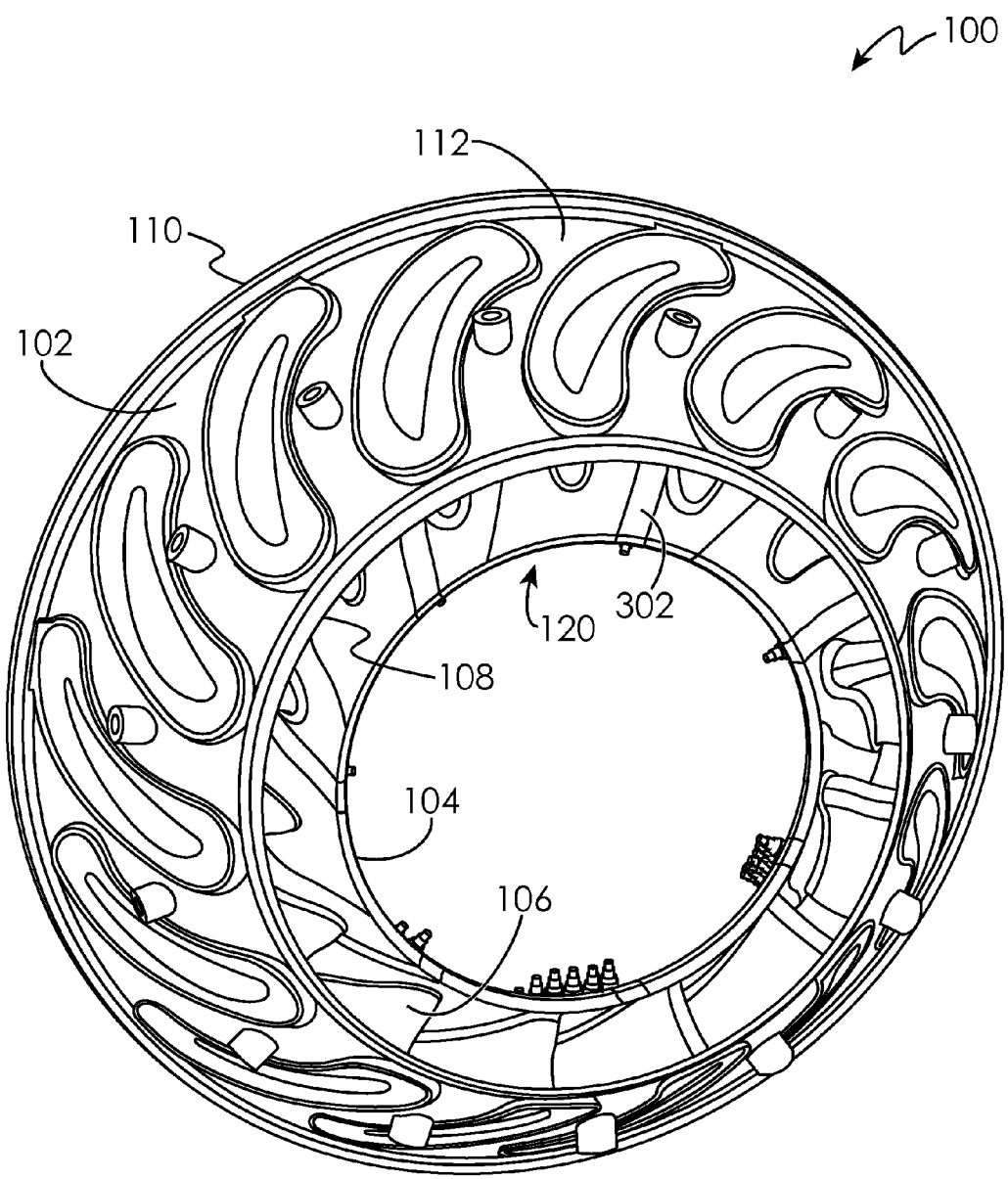
FIG. 3 is a schematic perspective view of a mid-turbine frame in an embodiment.
Figure 4:
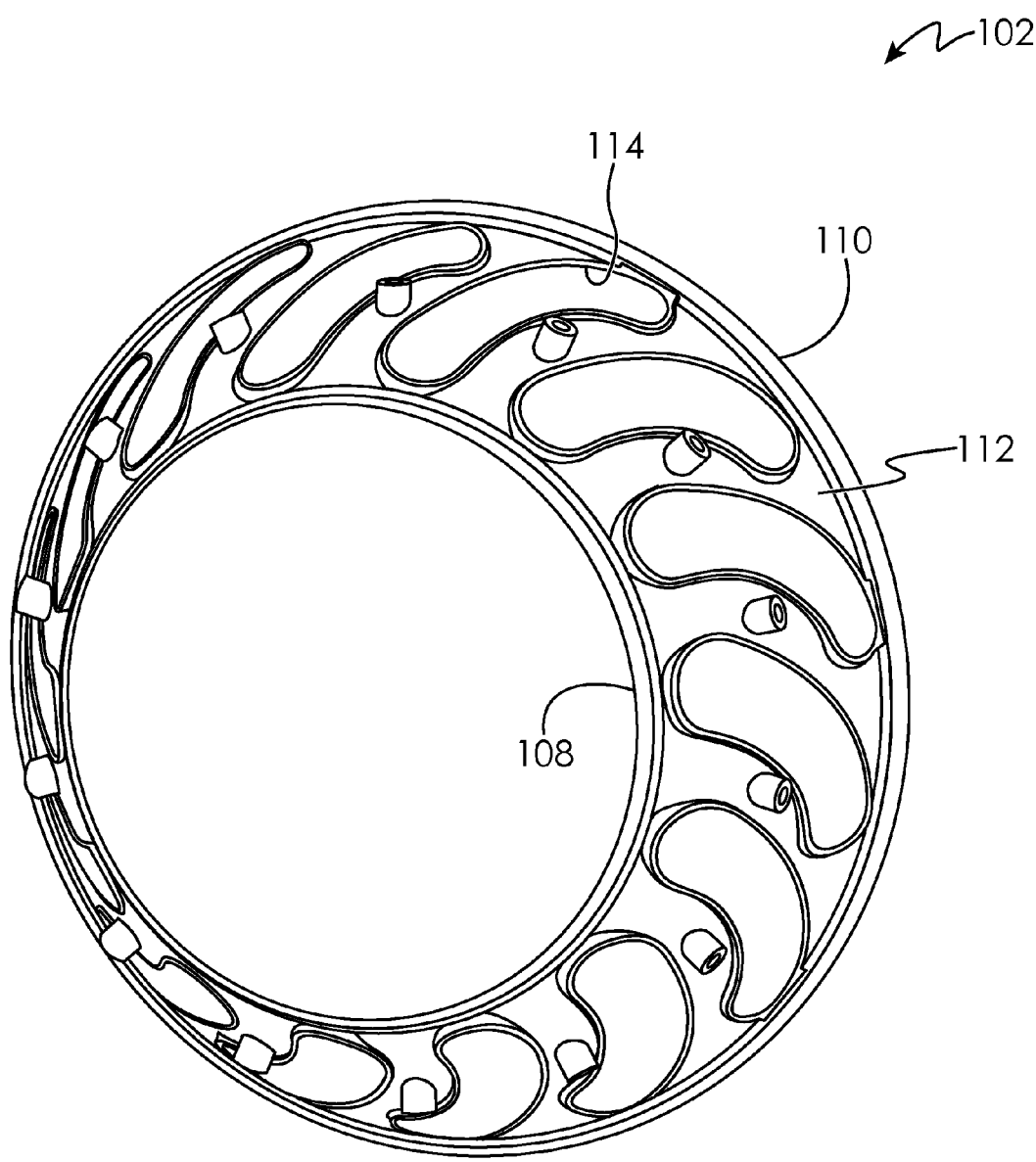
FIG. 4 is a schematic perspective view of an outer flowpath ring of a mid-turbine frame in an embodiment.

With reference to FIG. 3, the MTF 100 may more particularly comprise an outer flowpath ring 102, an inner flowpath ring 104, and a plurality of vanes 106 extending therebetween. The outer flowpath ring 102 may comprise a unitary structure in an embodiment, as illustrated in FIG. 4. The outer flowpath ring 102 includes a forward edge 108 and an aft edge 110 with and outer flowpath ring surface 112 extending therebetween. A plurality of apertures 114 are formed in the outer flowpath ring surface 112 in some embodiments for mating with the plurality of vanes 106, as described in greater detail hereinbelow. The inner flowpath ring 104 and the plurality of vanes 106 may be formed as a plurality of segments 120 in an embodiment, wherein the segments 120 may be coupled to one another and coupled to the outer flowpath ring 102 to form the MTF 100. The segments 120 may be formed as singlets (one vane 106 per segment 120), doublets (two vanes 106 per segment 120), or greater numbers of vanes 106 per segment 120.

Figure 5:
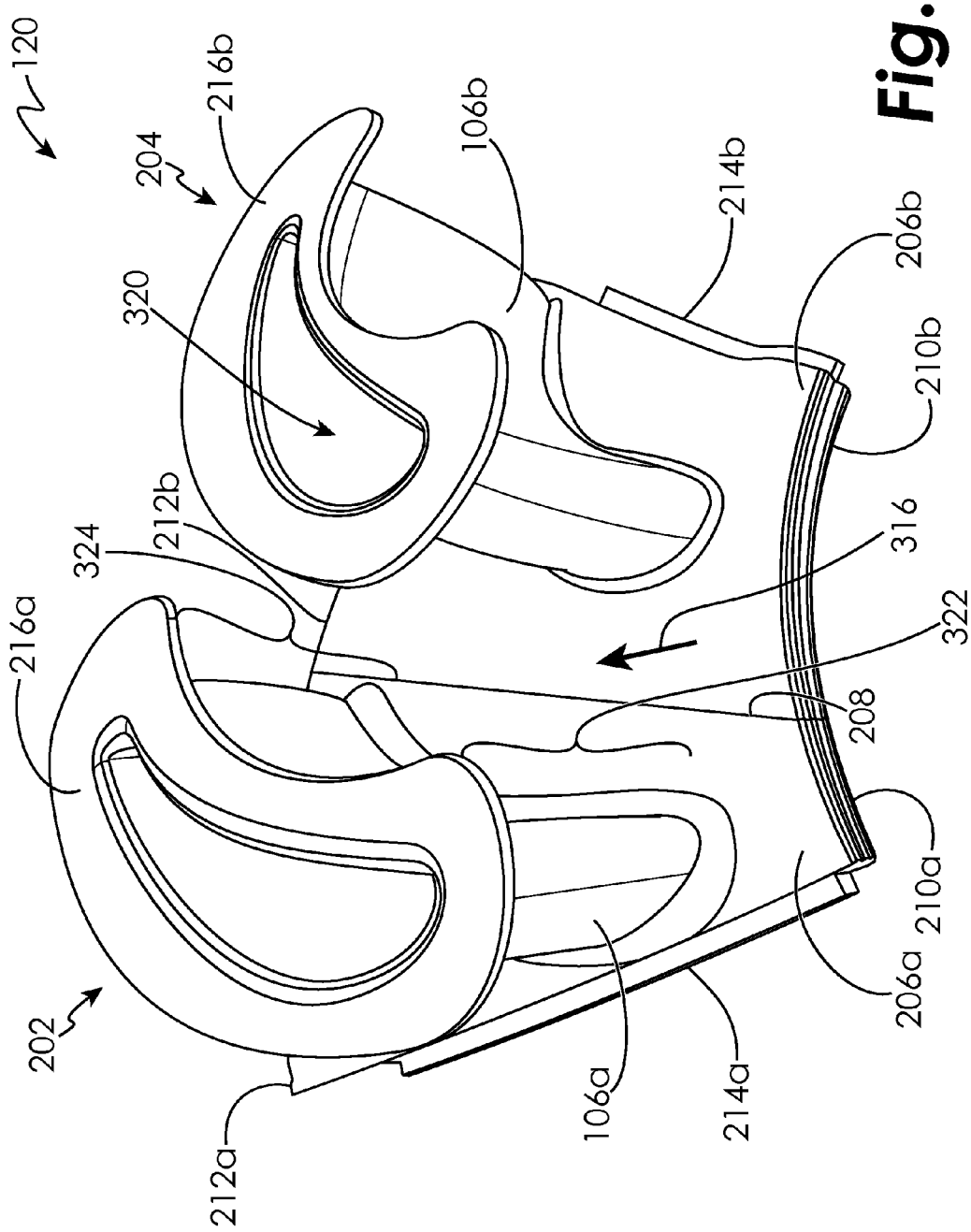
FIG. 5 is a schematic perspective view of a mid-turbine frame segment in an embodiment.

FIG. 5 illustrates a segment 120 formed as a doublet in an embodiment. The segment 120 may be formed from a first segment portion 202 and a second segment portion 204. In other embodiments, the segment 120 is formed as a unitary structure. Multiple segments 120 may comprise radially inner arcing surfaces that may be joined or sealed, as described herein, to form the inner flowpath ring 104 of an MTF 100. Segments 120 may be coupled to the outer flowpath ring 102, as described herein, to form the MTF 100, wherein outer flowpath ring 102 is radially farther from central axis A than inner flowpath ring 104. Specifically, the first segment portion 202 may comprise an inner arcing surface 206a, while the second segment portion 204 may comprise an inner arcing surface 206b. First segment portion 202 and second segment portion 204 may be joined at interface 208 such as by brazing, to name just one non-limiting example. Joining first segment portion 202 and a second segment portion 204 at interface 208 creates a doublet segment 120. The inner arcing surface 206a includes a forward edge 210a and an aft edge 212a. The inner arcing surface 206b includes a forward edge 210b and an aft edge 212b.

As discussed above, the MTF 100 may comprise a plurality of vanes 106 that extend radially outward from the inner flowpath ring 104 toward the outer flowpath ring 102.

In some embodiments, each vane 106 may comprise a channel that houses a variety of components (e.g., support struts, air and oil service lines, and the like). In various embodiments, any number of vanes may be used in the construction of an MTF 100 (e.g., 9 vanes, 14 vanes, 18 vanes, and the like). The inner arcing surface 206a may carry a vane 106a and the inner arcing surface 206b may carry a vane 106b. Each vane 106 may be integrally formed as a unitary structure with each respective inner arcing surface 206 in an embodiment, such as by casting or machining, to name just two non-limiting examples. In another embodiment, each vane 106 may be separately formed and then coupled to each respective inner arcing surface 206, such as by brazing to name just one non-limiting example.

Each segment 120 may include a plurality of tenons that define axial terminuses of each segment 120. For example, the first segment portion 202 inner arcing surface 206a may include a tenon 214a that defines a first axial terminus of the segment 120. The second segment 204 inner arcing surface 206b may include a tenon 214b that defines a second axial terminus of the segment 120.

Figure 6:
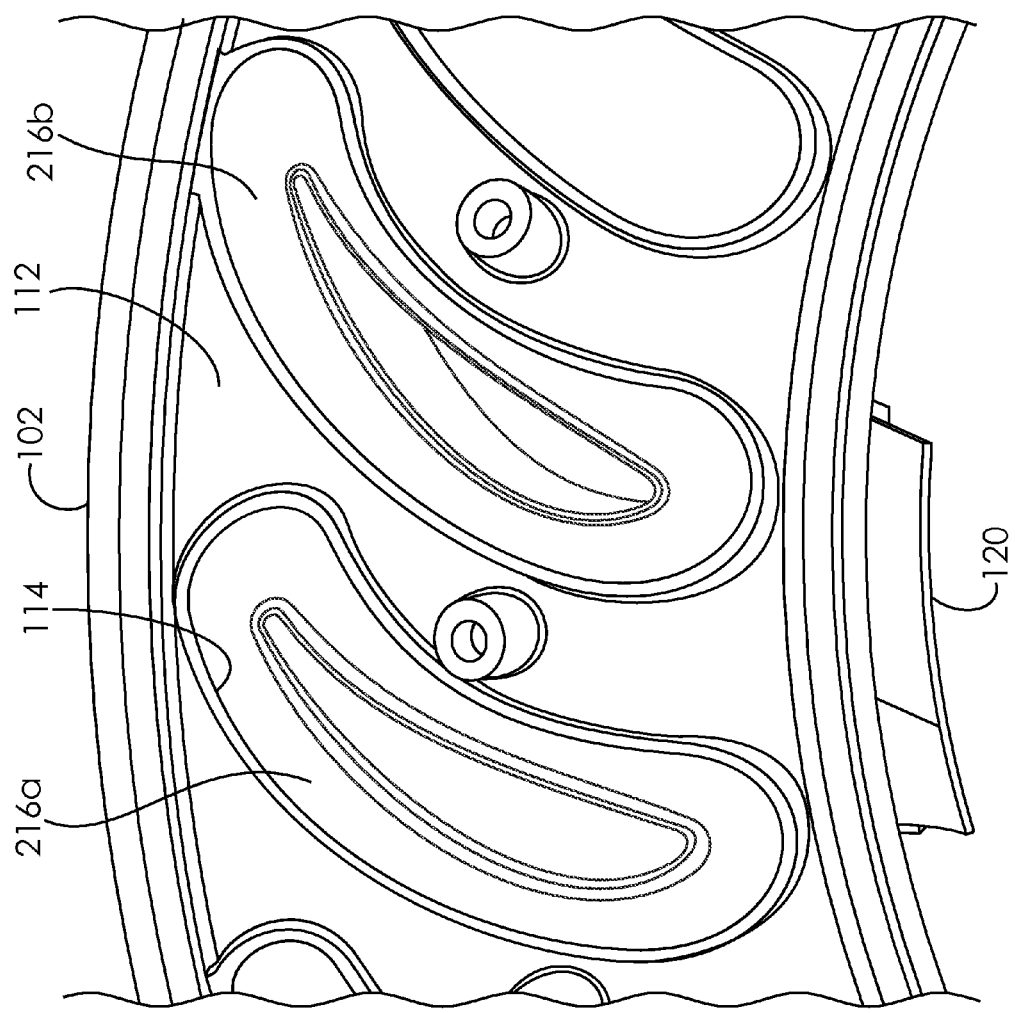
FIG. 6 is a schematic plan view of a mid-turbine frame outer flowpath ring and mid-turbine frame segment in an embodiment.

Each vane 106 may include a radially outer vane surface to facilitate attachment to the outer flowpath ring 102 in some embodiments. For example, the vane 106a may include a radially outer vane surface 216a, while the vane 106b may include a radially outer vane surface 216b. In some embodiments, the orientation of the vanes 106a/106b in each doublet segment 120 allow for machining from a common plane. With reference to FIG. 6, this orientation also allows the doublet segment 120 to be installed on the outer flowpath ring 102 along a single radial line. The segment 120 is positioned such that each radially outer vane surface 216 is disposed adjacent a respective aperture 114 formed in the outer flowpath ring surface 112. The segment 120 is then coupled to the outer flowpath ring 102. In some embodiments, each radially outer vane surface 216 is welded at the juncture with the respective aperture 114 and a brazing paste is applied to the juncture. The outer flowpath ring 102 and the plurality of segments 120 may then be placed in a brazing furnace to complete the joining operation.

Figure 7:
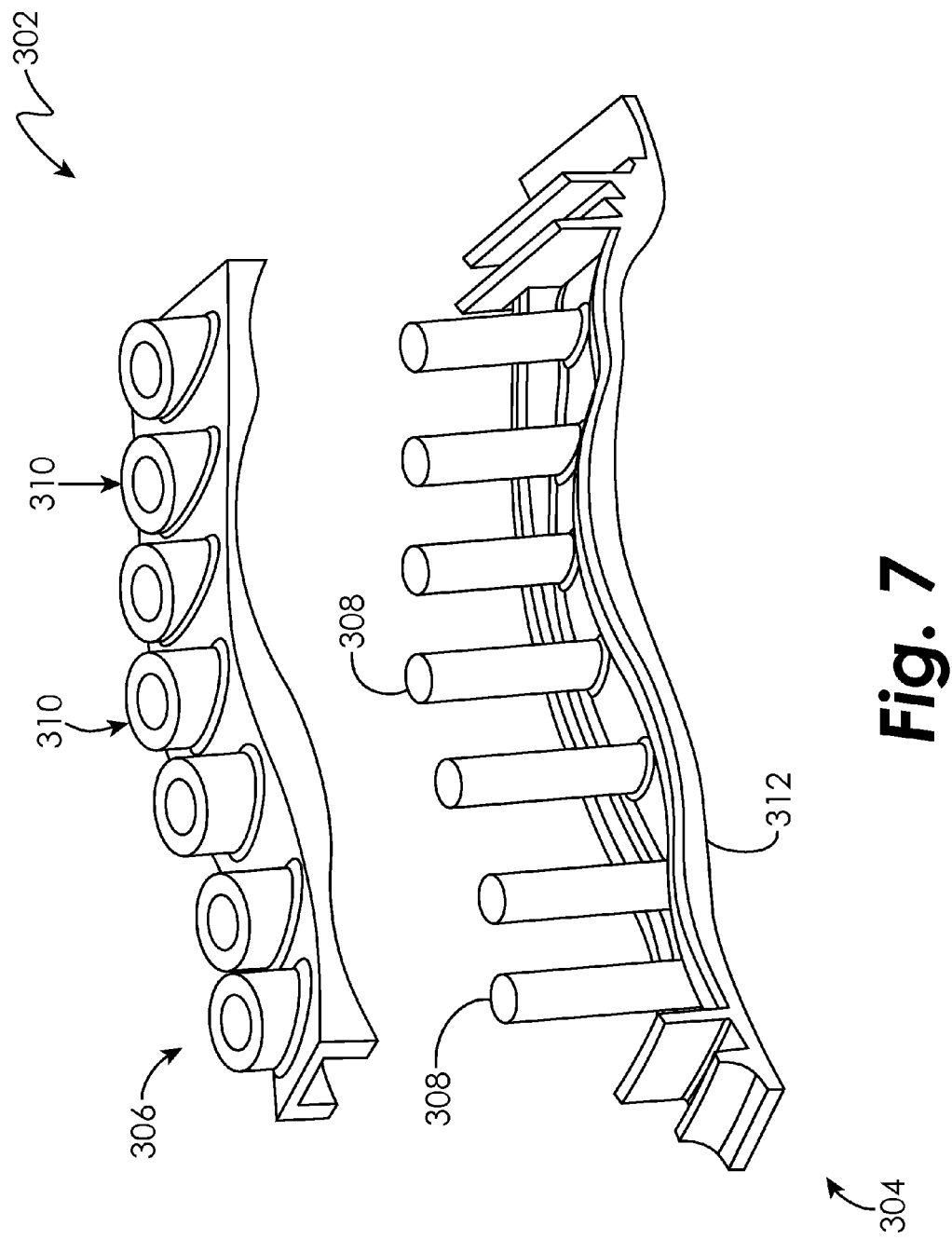
FIG. 7 is a schematic perspective view of a seal in an embodiment.
Figure 8:
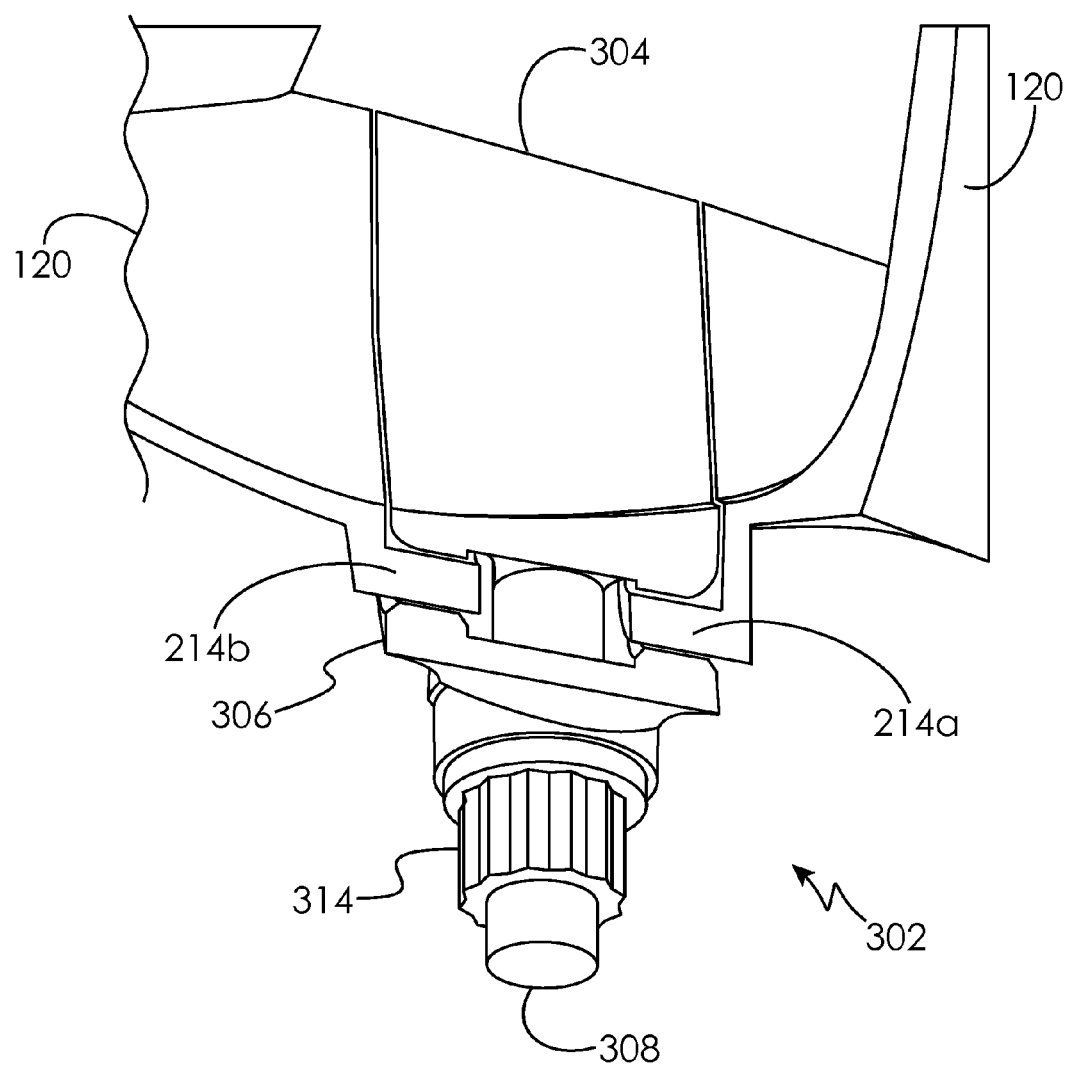
FIG. 8 is a schematic partial cross-sectional view of a seal of a mid-turbine frame in an embodiment.

In various embodiments, each segment 120 comprising the MTF 100 may be coupled to an adjacent segment 120 by a seal 302 as illustrated in FIG. 3. For example, with reference to FIGS. 7-8, the tenon 214b of a first segment 120 may be coupled by the seal 302 to the tenon 214a of a second segment 120. The seal 302 may thus couple or clamp the first segment 120 to the second segment 120 to form the inner flowpath ring 104. Thus, a plurality of seals 302 may couple a plurality of segments 120 to form a substantially annular duct or MTF 100. In some embodiments, the seal 302 is an occluding seal.

A seal 302 may comprise a first (male) member 304 and a second (female) member 306. In various embodiments, the first member 304 (also referred to herein as a male seal structure) may comprise a plurality of protruding members 308 arranged axially along an axial member or body 312 while the second member 306 (also referred to herein as a receiving member) may comprise an axial member having a plurality of apertures 310 configured to receive respective ones of the plurality of protruding members 308. A fastener, such as a self-locking nut 314 may be coupled to protruding member 308, thereby retaining protruding member 308 in contact with second member 306.

It may be understood that in a gas turbine engine, various components are supported by support structures such as support struts and the like. Moreover, air and oil service lines may be along the radius of central axis A to serve various radially inward components. However, as MTF 100 is situated aft of HPT 54 and is configured to receive hot gases from HPT 54, support struts, air and oil service lines, and the like would be impaired or destroyed by hot gases from HPT 54. In various embodiments, hot gases from HPT 54 are above 900° F. Accordingly, the plurality of vanes 106 may be configured to both shield high temperature intolerant components from hot gases while also imposing minimal or near minimal aerodynamic resistance.

With reference again to FIG. 5, vanes 106a and 106b are shown disposed in gas flow 316. Gas flow 316 may flow in a volume bounded by the outer flowpath ring 102 and the inner flowpath ring 104. Vanes 106a and 106b are shaped so as to reduce aerodynamic resistance. For example, the curved profile of vanes 106a and 106b may tend to reduce drag. Vane 106b, for example, defines channel 320 that extends radially toward central axis A. One or more high temperature intolerant components (not shown) may be disposed along or at least partially along channel 320 so that vane 106b provides thermal and/or aerodynamic protection to the one or more high temperature intolerant components.

Vanes 106a and 106b may vary in radial length from forward to aft. For example, the radial length of vane 106a at its most forward position is shown as length 322. In various embodiments, the radial length of vane 106a at its most aft position is shown as length 324. In various embodiments, length 322 is less than length 324.

Segments 120 and outer flowpath ring 102 may comprise any material suitable for exposure to the hot gas flowpath gases. For example, segments 120 and outer flowpath ring 102 may comprise nickel, cobalt, and other metals and/or metal alloys.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A mid-turbine frame for a gas turbine engine comprising: a duct that extends between a high pressure turbine and a low pressure turbine, the duct comprising an outer flowpath ring and an inner flowpath ring; wherein the inner flowpath ring is situated radially inward of the outer flowpath ring; wherein the outer flowpath ring comprises a unitary structure; and wherein the inner flowpath ring comprises a plurality of segments that together form the inner flowpath ring; and wherein each segment includes a first tenon that defines a first axial terminus of each segment and a second tenon that defines a second axial terminus of each segment; wherein the first tenon of a first segment is joined to the second tenon of a second segment by a seal that clamps the first tenon and the second tenon together; wherein the seal comprises: a male seal structure having a body and a protruding member extending away from the body, and female seal structure defining a receiving member having an aperture configured to receive the protruding member; and wherein the seal extends from a forward edge to an aft edge of each of the first and second tenons.

2. The mid-turbine frame of claim 1, wherein the inner flowpath ring comprises a plurality of inner arcing surfaces, each of the inner arcing surfaces carrying at least one vane that extends radially outward from the inner arcing surface toward the outer flowpath ring.

3. The mid-turbine frame of claim 1, wherein each of the segments are formed as a unitary structure.

4. The mid-turbine frame of claim 2, wherein each vane includes a channel.

5. The mid-turbine frame of claim 1, further comprising a fastener configured to be coupled to the protruding member to retain the protruding member in contact with the receiving member.

6. The mid-turbine frame of claim 5, wherein the receiving member is coupled to a radially inward portion of the first and second tenons and the male seal structure is coupled to a radially outward portion of the first and second tenons.

7. The mid-turbine frame of claim 1, wherein the duct defines a hot gas path between the high pressure turbine and the low pressure turbine.

8. The mid-turbine frame of claim 2, wherein the plurality of vanes are coupled to the outer flowpath ring.

9. The mid-turbine frame of claim 8, wherein said coupling comprises welding and brazing.

10. The mid-turbine frame of claim 2, wherein two of the vanes extend from each segment.

11. The mid-turbine frame of claim 2, wherein each segment comprises a first segment portion coupled to a second segment portion.

12. A gas turbine engine comprising: a compressor section, a combustor section, a high pressure turbine, a mid-turbine frame, and a low pressure turbine in serial flow communication, wherein the mid-turbine frame comprises: a duct that extends between the high pressure turbine and the low pressure turbine, the duct comprising an outer flowpath ring and an inner flowpath ring; wherein the inner flowpath ring is situated radially inward of the outer flowpath ring; wherein the outer flowpath ring comprises a unitary structure; and wherein the inner flowpath ring comprises a plurality of segments that together form the inner flowpath ring; and wherein each segment includes a first tenon that defines a first axial terminus of each segment and a second tenon that defines a second axial terminus of each segment; wherein the first tenon of a first segment is joined to the second tenon of a second segment by a seal that clamps the first tenon and the second tenon together; wherein the seal comprises: a male seal structure having a body and a protruding member extending away from the body, and a female seal structure defining a receiving member having an aperture configured to receive the protruding member; and wherein the seal extends from a forward edge to an aft edge of each of the first and second tenons.

13. The mid-turbine frame of claim 12, wherein the inner flowpath ring comprises a plurality of inner arcing surfaces, each of the inner arcing surfaces carrying at least one vane that extends radially outward from the inner arcing surface toward the outer flowpath ring.

14. The mid-turbine frame of claim 12, wherein each of the segments are formed as a unitary structure.

15. The mid-turbine frame of claim 13, wherein the plurality of vanes are coupled to the outer flowpath ring.

* * * * *